(12) United States Patent
Marchand

(10) Patent No.: US 11,869,678 B2
(45) Date of Patent: Jan. 9, 2024

(54) POSITIONING ATOMS USING OPTICAL TWEEZER TRAPS

(71) Applicant: BULL SAS, Les Clayes Sous Bois (FR)

(72) Inventor: Bertrand Marchand, Paris (FR)

(73) Assignee: BULL SAS, Les Clayes sous Bois (FR)

( * ) Notice: Subject to any disclaimer, the term of this patent is extended or adjusted under 35 U.S.C. 154(b) by 181 days.

(21) Appl. No.: 17/333,581

(22) Filed: May 28, 2021

(65) Prior Publication Data
US 2021/0375499 A1 Dec. 2, 2021

(30) Foreign Application Priority Data
May 29, 2020 (EP) .................................... 20305568

(51) Int. Cl.
*G21K 1/00* (2006.01)
*G06N 10/00* (2022.01)

(52) U.S. Cl.
CPC ............. *G21K 1/006* (2013.01); *G06N 10/00* (2019.01)

(58) Field of Classification Search
CPC ......... G06N 10/00; G21K 1/006; G21K 10/06
See application file for complete search history.

(56) References Cited

U.S. PATENT DOCUMENTS

2021/0279631 A1* 9/2021 Pichler .................. G06N 10/20

OTHER PUBLICATIONS

Babcock, Nathan, "Entangling Identical Bosons in Optical Tweezers via Exchange Interaction", arxiv.org, Cornell University Library, 201, Olin Library Cornell University Ithaca NY, 14653, Dec. 15, 2007 (Year: 2007).*
Leseleuc et al. Observation of a Symmetry-Protected Topological Phase of Interacting Bosons with Rydberg Atoms, Science Aug. 1, 2019) (Year: 2007).*
Pichler, et al., "Quantum Optimization for Maximum Independent Set Using Rydberg Atom Arrays", Quantum Physics, arXiv.org > quant-ph > arXiv:1808.10816, Aug. 31, 2018.

(Continued)

*Primary Examiner* — David E Smith
(74) *Attorney, Agent, or Firm* — MEAGHER EMANUEL LAKS GOLDBERG & LIAO, LLP (57) ABSTRACT

Examples include a method to position atoms. The method comprises considering a target Hamiltonian encoding a specific problem to resolve using an optical tweezer traps quantum computing system. The method also comprises considering a set of representative Hamiltonians function of a position configuration of atoms in the quantum computing system. The method further comprises determining a specific position configuration whereby a specific similarity measure between the target Hamiltonian and a specific Hamiltonian of the representative Hamiltonians function of the specific position configuration is improved compared to another similarity measure between the target Hamiltonian and at least one other representative Hamiltonian function of a position configuration differing from the specific position configuration. In response to the determination of the specific position configuration, the method comprises positioning atoms in the specific position configuration in order to attempt to resolve the specific problem using the quantum computing system.

16 Claims, 3 Drawing Sheets

(56) References Cited

OTHER PUBLICATIONS

Pichler et al., "Computational complexity of the Rydberg blockade in two dimensions", Quantum Physics, arXiv.org > quant-ph > arXiv:1809.04954, Sep. 13, 2018.

Labuhn et al., "Tunable two-Dimentional arrays of single Rydberg atoms for realizing quantum Ising models", Nature 534, 667-670, https://doi.org/10.1038/nature18274, Jun. 1, 2016.

Lienhard et al., "Observing the Space- and Time-Dependent Growth of Correlations in Dynamically Tuned Synthetic Ising Models with Antiferromagnetic Interactions", Phys. Rev. X 8, 021070, Jun. 18, 2018.

SciPy minimize submodule, SciPy version 1.4.1, docs.scipy.org/doc/scipy-1.4.1/reference/optimize.minimize-trustconstr.html#optimize-minimize-trustconstr, last updated Dec. 19, 2019, last accessed Aug. 23, 2021.

European Search Report for corresponding European Application No. 20 30 5568, dated Nov. 13, 2020.

Nathan S Babcock et al, "Entangling identical bosons in optical tweezers via exchange interaction", Arxiv.org. Cornell University Library. 201, Olin Library Cornell University Ithaca. NY 14853, Dec. 15, 2007 (Dec. 15, 2007).

Browaeys, A. et al., "Experimental Investigations of dipole-dipole interactions between a few Rydberg atoms", Journal of Physics B: Atomic, Molecular and Optical Physics (2016), pp. 152001, 49 (15), IOP Publishing.

Léséleuc, S. et al., "Observation of a symmetry-protected topological phase of interacting bosons with Rydberg atoms", Science (2019), 13 pages.

Léséleuc, S. et al., "Supplementary Materials for Observation of a symmetry-protected topological phase of interacting bosons with Rydberg atoms", Science (2019), 23 pages.

European Search Report for corresponding EP Application No. 20305568.6, dated Dec. 16, 2022.

* cited by examiner

POSITIONING ATOMS USING OPTICAL TWEEZER TRAPS

CROSS-REFERENCE TO RELATED APPLICATIONS

This application claims priority to EP Patent Application No. 20305568.6, filed May 29, 2020, the entire contents of which is hereby incorporated herein by reference.

BACKGROUND

Quantum computing permits attempting to resolve problems using qubits in lieu of bits as in classical computing. These qubits can for instance be implemented, in practice, using atoms or ions. The processing of such qubits in quantum computing relies in part on interactions between ions or atoms in a quantum computing system. The position of such ions or atoms in the quantum computing system may then have an influence on a result of a quantum computing operation.

SUMMARY

The invention is defined by the appended independent claims. Additional features and advantages of the concepts herein disclosed are set forth in the description which follows.

The present disclosure describes a method to position atoms using optical tweezer traps, the method comprising:
  considering a target Hamiltonian, the target Hamiltonian encoding a specific problem to resolve using an optical tweezer traps quantum computing system;
  considering a set of representative Hamiltonians, each representative Hamiltonian being a function of a position configuration of atoms in the quantum computing system;
  determining a specific position configuration whereby a specific similarity measure between the target Hamiltonian and a specific Hamiltonian of the representative Hamiltonians function of the specific position configuration is improved compared to another similarity measure between the target Hamiltonian and at least one other representative Hamiltonian function of a position configuration differing from the specific position configuration; and
  in response to the determination of the specific position configuration, positioning atoms in the specific position configuration in order to attempt to resolve the specific problem using the quantum computing system.

Such a method permits determining a specific position configuration adapted to the resolution of the problem considered, thereby increasing a likelihood to resolve such specific problem. Optical tweezer traps indeed permit placing atoms in specific positions in a controlled manner.

Optionally each representative Hamiltonian is a function of a time variable, the time variable corresponding to an adiabatic evolution of the quantum computing system for attempting to resolve the specific problem. The following of an adiabatic evolution indeed further increases the likelihood to resolve the specific problem.

Optionally, the determining of the specific position configuration comprises iteratively evaluating similarity measures between the target Hamiltonian and a plurality of representative Hamiltonians. Such an iteration permits progressively improving the approximation to the target Hamiltonian, as quantified for instance by the similarity measure, thereby permitting obtaining an improved specific position configuration. In some cases, such iterative evaluation is a converging iterative evaluation. In some cases, the iterative evaluation is concluded when a condition is met, which for example permits limiting a time during which the process gets iterated. In some cases, the condition comprises the specific similarity measure being compared to a similarity measure threshold, thereby permitting reaching a desired specific similarity measure. In some cases, the condition comprises a number of iterations reaching an iteration limit, thereby avoiding reaching an excessive number of iterations.

Optionally, the method further comprises attempting to resolve the specific problem using the quantum computing system in response to the positioning of the atoms, the attempt to resolve occurring through an adiabatic evolution. This permits leveraging the specific position configuration to attempt resolving the specific problem.

Optionally, any representative Hamiltonian, H, is defined by:

$$H(\{x_i\}, t) = \sum_{i,j \text{ atoms}} \sum_{\alpha,\beta \in \{0,1,2,3\}} c_{i,j}^{\alpha,\beta}(\vec{x}_i, \vec{x}_j, t)\sigma_i^\alpha \otimes \sigma_j^\beta + \sum_{i \text{ atoms}} \sum_{\alpha \in \{0,1,2,3\}} c_i^\alpha(\vec{x}_i, t)\sigma_i^\alpha$$

where:
  $\{\vec{x}_i\}$ are real vectors where $\vec{x}_i$ specifies the position of atom i;
  t is a time variable;
  $c_{i,j}^{\alpha,\beta}(\vec{x}_i, \vec{x}_j, t)$ are $c_i^\alpha(\vec{x}_i, t)$ are real scalar coefficients depending on the positions and time;
  $\sigma_i^0$, $\sigma_i^1$, $\sigma_i^2$ and $\sigma_i^3$ are Pauli matrices; and
  $\otimes$ is the standard Kronecker product.

Such specific representative Hamiltonian formula permits taking atom positions into account.

Optionally, the specific problem is a Maximum Independent Set, MIS, problem. The methods according to this disclosure were indeed found to be particularly suited to be applied to such a problem. In some cases, the target Hamiltonian, $H_{MIS}$, is defined by:

$$H_{MIS} = \sum_{(u,v) \in E} U \cdot n_u \otimes n_v - \sum_{v \in V} \Delta \cdot n_v$$

where:
  $U > \Delta > 0$, U and $\Delta$ being real scalar;
  (V, E)=G, V and E being, respectively, a vertex set and an edge set of a graph G;
  For any $$u \in V, n_u = \frac{1 - \sigma_u^3}{2} \text{ i.e } n_u = \begin{pmatrix} 0 & 0 \\ 0 & 1 \end{pmatrix}; \text{ and}$$

$\otimes$ is the Kronecker product.

Such a target Hamiltonian formula was indeed found to apply to the MIS problem.

Optionally, the atoms optical tweezer traps quantum computing system is a two dimensional Rydberg atoms optical tweezer traps quantum computing system, which was found to be particularly suited to the application of the methods hereby disclosed, in particular due to the number of positions available for the atoms in such quantum computing systems. In some cases, each representative Hamiltonian $HR_yd$ is defined by:

$$H_{Ryd} = \sum_{i,j} \frac{C}{|\vec{x_i} - \vec{x_j}|^6} n_i n_j - \sum_i \Delta_i(t) n_i + \sum_i \Omega_i(t) \sigma_i^x$$

where:

$\vec{x_i}$ is a real vector describing the position of the $i^{th}$ Rydberg atom in a two dimensional plane;

$$n_i = \frac{1 - \sigma_i^z}{2};$$

$$\sigma_i^x = \begin{pmatrix} 0 & 1 \\ 1 & 0 \end{pmatrix};$$

$\Delta_i(t)$ and $\Omega_i(t)$ are time-dependent real parameters; and

C is an interaction strength arising from Van der Waals interactions between Rydberg atoms in a same Rydberg state |r>.

Such a representative Hamiltonian formula was indeed found to reflect the positioning of Rydberg atoms in a two dimensional plane.

The present disclosure also describes a computer-readable storage medium comprising instructions which, when executed by a processor of a specific device, cause the processor to carry out any of the methods hereby described.

The present disclosure also describes a device comprising a processor, a memory and a networking module, the processor being configured to operate according to any of the methods hereby described.

DETAILED DESCRIPTION

This disclosure applies to methods to position atoms using optical tweezer traps. Optical tweezer traps permit positioning atoms on a per atom basis. Optical tweezer traps operate using a highly focused laser beam to maintain or place an atom in a specific position. Optionally, they may consist in a single trap duplicated in space using a Spatial Light Modulator, which imprints the appropriate phase pattern prior to focusing the laser. Such a set of duplicated tweezer traps may be called "array of optical tweezer traps". The loading of a set of atoms into a target position configuration using such an array may then happen by randomly loading, at a certain filling rate, a set of atoms into a position configuration containing the target configuration as a subset, before actively sorting the atoms into the target configuration using moving optical tweezers. Such tweezer traps may be used as part of a quantum computing system, whereby atoms placed in the optical tweezer trap may be used as qubits, such qubits being submitted to a quantum computing operation. Such quantum computing systems may be used to attempt resolving specific problems which would be particularly challenging to resolve using classical non quantum computing systems. It was found that the attempt at resolving such problems may result in one or more candidate solutions being provided by the quantum computing operation, whereby such candidate solution may in some cases be approximations to an actual solution. It was found that the placement of the atoms in the optical tweezer trap prior to initiating the quantum computing operation as per the methods hereby disclosed was providing candidate solutions closer to an actual solution than using an atom placement based for example on intuition, for example using grid like positions by default. It should be noted that the atoms according to this disclosure may be in some cases in an ionized state and be ions.

Figure 1:
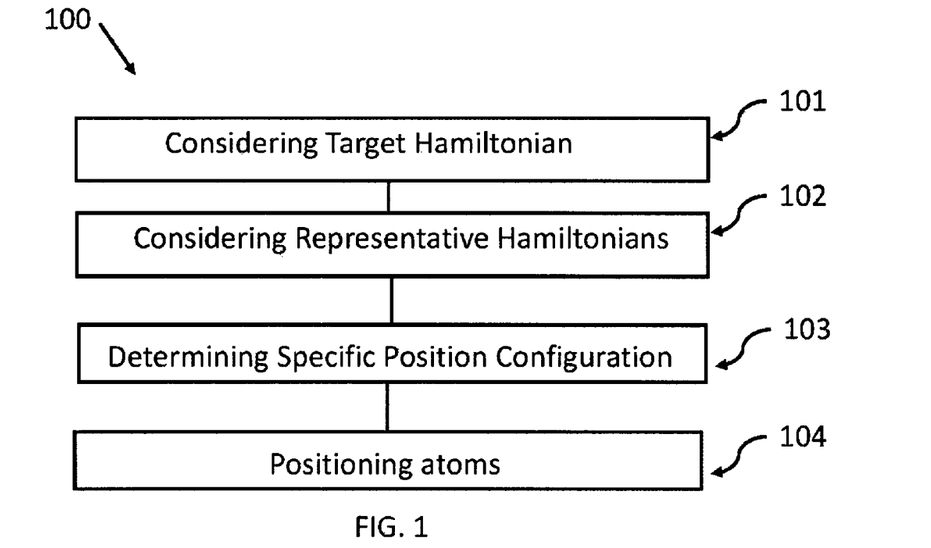
FIG. 1 illustrates an example method.

FIG. 1 illustrates an example method 100 to position atoms using optical tweezer traps according to this disclosure. In block 101, method 100 comprises considering a target Hamiltonian, the target Hamiltonian encoding a specific problem to resolve using an optical tweezer traps quantum computing system. The target Hamiltonian is such that its ground state contains the solution to the specific problem. That is, if a quantum system is prepared in this ground state, then carrying out a quantum measurement of the qubits of the system is likely (with good probability) to provide the optimal solution to the specific problem. A method to prepare systems in ground states of Hamiltonians is to rely on the Adiabatic Theorem, which states that if a transition between two Hamiltonians is slow enough, and the system is in the ground state of the first Hamiltonian at the beginning of the transition, then it will remain in the ground state of the instantaneous Hamiltonian throughout the transition.

Example method 100 also comprises in block 102 considering a set of representative Hamiltonians, each representative Hamiltonian being a function of a position configuration of atoms in the quantum computing system. A quantum system always has an associated Hamiltonian, describing its dynamics within its state space. Such dynamics, and therefore the Hamiltonian, are influenced by the positioning of the atoms. Various position configurations are available in an optical tweezer trap system, each position corresponding to a number of representative Hamiltonians, each representative Hamiltonian corresponding to a single position.

Example method 100 further comprises in block 103 determining a specific position configuration whereby a specific similarity measure between the target Hamiltonian and a specific Hamiltonian of the representative Hamiltonians function of the specific position configuration is improved compared to another similarity measure between the target Hamiltonian and at least one other representative Hamiltonian function of a position configuration differing from the specific position configuration. A similarity measure between a Hamiltonian and another should be understood as a measure of how similar a Hamiltonian is to another. In some examples, a similarity measure between two Hamiltonians is a distance between the two Hamiltonians. In another example, a similarity measure between two Hamiltonians is a distance between specific components of the Hamiltonians. In another different example, a similarity measure between two Hamiltonians involves specific components of the Hamiltonians taken at different times along the adiabatic evolution. In yet another different example, a similarity measure is a sum of penalty terms, each penalty term being associated to a pair of positions. The methods according to this disclosure aim for example at efficiently identifying a representative Hamiltonian (associated to an atom position configuration) relatively close to the target Hamiltonian (associated to the specific problem which one attempts to solve). The specific similarity measure between the target Hamiltonian and a specific Hamiltonian of the representative Hamiltonians function of the specific position configuration is improved compared to another similarity measure between the target Hamiltonian and at least one other representative Hamiltonian function of a position configuration differing from the specific position configuration. Depending on the nature or choice of the similarity measure, an improved similarity measure may for example be less than or more than another similarity measure. In some examples, the specific similarity measure between the target Hamiltonian and a specific Hamiltonian of the representative Hamiltonians function of the specific position configuration is less than another similarity measure between the target Hamiltonian and at least one other representative Hamiltonian function of a position configuration differing from the specific position configuration, for example if the similarity measure corresponds a distance. In some examples, the specific similarity measure between the target Hamiltonian and a specific Hamiltonian of the representative Hamiltonians function of the specific position configuration is more than another similarity measure between the target Hamiltonian and at least one other representative Hamiltonian function of a position configuration differing from the specific position configuration, for example if the similarity measure corresponds to the opposite of a distance. That is, the Hamiltonians may be relatively close to each other (a lesser similarity measure, when the measure is a distance D), or the Hamiltonians may be relatively not far from each other (a higher similarity measure, the similarity measure being the opposite of the distance, represented as − (minus) D).

Other examples of a specific similarity measure may comprise one or a combination of:

A scalar function, not necessarily being a distance.

Some or all of the components of a Hamiltonian

Some or all of the components of a Hamiltonian taken at different times, along the adiabatic evolution.

A specific example of a similarity measure which is not a distance may be as follows:

Given (deducted from a target Hamiltonian) a partition of a particle pair-wise interactions into two groups as follows:

Particle pairs for which the interactions which should be reinforced (by making particles closer) (group a)

Particle pairs for which the interactions which should be minimized (group b) A similarity measure for instance associates a "penalty" to each interaction in group b. Such penalty may a scalar term dependent on the positions of two atoms involved in the interaction. The similarity measure for example associates an "anti-penalty" or "reward" to each interaction in group (a). An example penalty for atoms part of group b may be $$\frac{\lambda}{|\vec{x_i} - \vec{x_j}|},$$

$\vec{x_i}$ and $\vec{x_j}$ representing the respective positions of atoms i and j, $\lambda$ being a scalar constant. An example anti penalty for atoms part of group a may be $\mu \cdot (\vec{x_i} - \vec{x_j})^2$, $\mu$ being another scalar constant. A full similarity measure may then be the sum of all the terms associated an interaction, the terms comprising the penalties and anti-penalties.

Example method 100 further comprises in block 104 positioning atoms in the specific position configuration in order to attempt to resolve the specific problem using the quantum computing system, and do so in response to the determination of the specific position configuration as per block 103. Such positioning takes place in the optical tweezer traps computing system using lasers of the optical tweezer traps. One should note that one refers here to an attempt to resolve due to the fact that the problems aimed at being resolved tend to be complex problems for which candidate solutions encountered may not be an exact optimal solution. Such non-optimal candidate solutions provided by the quantum computing system may theoretically be of better quality than candidate solutions provided by classical computing systems.

In some examples, each representative Hamiltonian as introduced for example in block 102 is a function of a time variable, the time variable corresponding to an adiabatic evolution of the quantum computing system for attempting to resolve the specific problem. When submitted to an adiabatic evolution, atoms comprised in a quantum computing system have interaction parameters which get changed slowly, thereby evolving their Hamiltonian from a first Hamiltonian towards a second Hamiltonian. If, at the beginning of the evolution, the state of the atoms corresponds to the fundamental state of the first Hamiltonian, and if the evolution from the first to the second Hamiltonian is adiabatic, or sufficiently slow, the state of the atoms at the end of the evolution will correspond to the fundamental state of the second Hamiltonian. If the system is prepared in the fundamental state of the first Hamiltonian, and the fundamental state of the second Hamiltonian encodes a solution to the problem, then a quantum measurement carried out on the state of atoms will yield the solution with good probability, in the case of an adiabatic evolution.

In some examples, the determining of the specific position configuration as illustrated for example in block 103 comprises iteratively evaluating similarity measures between the target Hamiltonian and a plurality of representative Hamiltonians. In some example each iteration corresponds to evaluating a similarity measure between the target Hamiltonian and a representative Hamiltonian of the plurality which corresponds to a given position configuration of atoms, whereby each iteration corresponds to a different position configuration of atoms. Such iterations will permit evaluating various different similarity measures corresponding to various different position configurations, in order to be in a position to select a representative Hamiltonian corresponding to a promising position configuration compared to other position configurations for which the similarity measure was also evaluated during the iteration. In some examples, the iterative evaluation is a converging iterative evaluation, whereby a variety of converging techniques may be used. In some examples, the iterative evaluation is concluded when a condition is met. In some examples, the condition comprises specific similarity measures being compared to a similarity measures threshold. In such cases, iterations may be continued until a specific similarity measure reaches or crosses such threshold, implying that the representative Hamiltonian corresponding to such specific similarity measure is considered sufficiently close to the target Hamiltonian, such that the representative Hamiltonian is considered to closely correspond to a representation of the specific problem. In some cases, the condition comprises a number of iterations reaching an iteration limit. In such cases, the iteration process is thereby limited in time. Such iteration limit may be combined with a threshold condition, whereby the iterations are stopped when either one of the threshold condition or the number of iteration condition is met, thereby for example avoiding a situation where a threshold condition does not get met even after numerous iterations. In some examples, the condition comprises specific similarity measures being below a similarity measures threshold. In some examples, the condition comprises specific similarity measures being above a similarity measures threshold.

Figure 2:
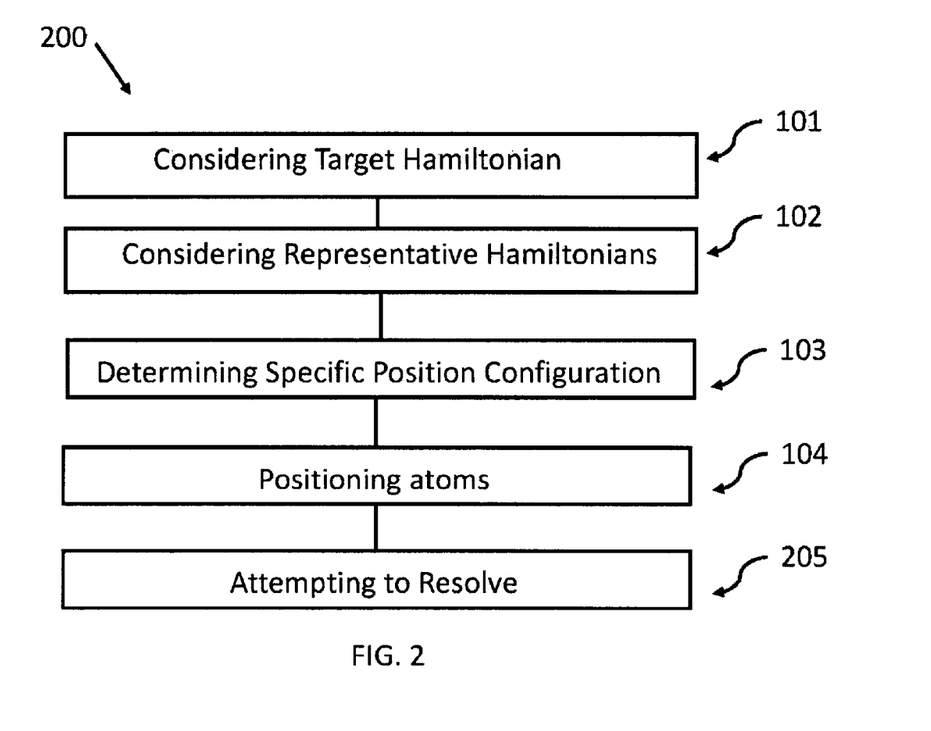
FIG. 2 illustrates another example method.

An example method 200 according to this disclosure is illustrated by FIG. 2. Example method 200 comprises blocks 101 to 104 which have been described in the context of example method 100. In addition to blocks 101-104, method 200 further comprises block 205 of attempting to resolve the specific problem using the quantum computing system in response to the positioning of the atoms, the attempt to resolve occurring through an adiabatic evolution. Block 205 thereby leads to identifying one or more candidate solutions to the specific problem, such solutions being based on positioning the atoms according to the method of the invention, thereby permitting reaching a relatively high likelihood to encounter better solutions or better approximate solutions to the problem compared to positioning the atoms without comparing Hamiltonians as per the methods hereby disclosed.

In some example methods including for example the methods hereby described, any representative Hamiltonian H is defined by:

$$H(\{x_i\}, t) = \sum_{i,j \text{ atoms}} \sum_{\alpha,\beta \in \{0,1,2,3\}} c_{i,j}^{\alpha,\beta}(\vec{x_i}, \vec{x_j}, t)\sigma_i^\alpha \otimes \sigma_j^\beta + \sum_{i \text{ atoms}} \sum_{\alpha \in \{0,1,2,3\}} c_i^\alpha(\vec{x_i}, t)\sigma_i^\alpha$$

where:

$\{\vec{x}_i\}$ are real vectors where $\vec{x}_i$ specifies the position of atom i;

t is a time variable;

$c_{i,j}^{\alpha,\beta}(\vec{x}_i, \vec{x}_j, t)$ are $c_i^\alpha(\vec{x}_i, t)$ are real scalar coefficients depending on the positions and time;

$\sigma_i^0$, $\sigma_i^1$, $\sigma_i^2$ and $\sigma_i^3$ are Pauli matrices; and $\otimes$ is the standard Kronecker product.

Such Hamiltonians are restricted to having interactions between pairs of atoms only. When running an adiabatic calculation or an operation following an adiabatic evolution, such Hamiltonian will continuously evolve from $H(\{x_i\}, t_0)$ towards $H(\{x_i\}, t_f)$ where $t_0$ is an initial time of evolution and $t_f$ is a final time corresponding to the time of an adiabatic evolution or calculation, and whereby the positions $\{x_i\}$ of the atoms do not vary during the evolution or calculation. For each atom, the Pauli matrices may be defined as follows, where, inside the following matrices, i is the complex number and does not refer to atom i:

$$\sigma_i^0 = \begin{pmatrix} 1 & 0 \\ 0 & 1 \end{pmatrix}, \sigma_i^1 = \begin{pmatrix} 0 & 1 \\ 1 & 0 \end{pmatrix}, \sigma_i^2 = \begin{pmatrix} 0 & -i \\ i & 0 \end{pmatrix}$$

(within $\sigma_i^2$, i is the complex number such that $i^2=-1$ and does not refer to atom i) and $$\sigma_i^3 = \begin{pmatrix} 1 & 0 \\ 0 & -1 \end{pmatrix}.$$

In some examples, the specific problem is a Maximum Independent Set (MIS) problem. Such a problem is an NP (nondeterministic polynomial) difficult combinatorial optimization problem. The resolution or resolution attempt of instances of such a problem using quantum computing systems may return results which do not respect linear constraints of the problem, for example due to encoding imprecisions, measurement errors or noise. The methods according to this disclosure permit compensating at least partially some of such issues. In some examples, the specific problem is a UD (unit disk) MIS problem which is NP difficult.

In some examples where the specific problem is a MIS problem, the target Hamiltonian, $H_{MIS}$, is defined by:

$$H_{MIS} = \sum_{(u,v) \in E} U \cdot n_u \otimes n_v - \sum_{v \in V} \Delta \cdot n_v$$

where:
U>Δ>0, U and Δ are real scalars;
(V, E)=G, V and E are, respectively, a vertex set and an edge set of a graph G;
For any $$u \in V, n_u = \frac{1-\sigma_u^3}{2} \text{ i.e } n_u = \begin{pmatrix} 0 & 0 \\ 0 & 1 \end{pmatrix}; \text{ and}$$

$\otimes$ is the Kronecker product.

Such target Hamiltonian corresponds for example to the target Hamiltonian considered in block 101. Such target Hamiltonian encodes the related MIS specific problem.

In some example methods, the atoms optical tweezer traps quantum computing system is a two dimensional Rydberg atoms optical tweezer traps quantum computing system. Such two dimensional systems offer a wide variety of position configurations which makes them particularly suited to the methods hereby described. In some of such examples, each representative Hamiltonian $HR_{Ryd}$ is defined by $$H_{Ryd} = \sum_{i,j} \frac{C}{|\vec{x_i} - \vec{x_j}|^6} n_i n_j - \sum_i \Delta_i(t) n_i + \sum_i \Omega_i(t) \sigma_i^2$$

where:

$\vec{x}_i$ is a real vector describing the position of the $i^{th}$ Rydberg atom in a two dimensional plane;

$$n_i = \frac{1-\sigma_i^3}{2};$$

$$\sigma_i^2 = \begin{pmatrix} 0 & 1 \\ 1 & 0 \end{pmatrix};$$

$\Delta_i(t)$ and $\Omega_i(t)$ are time-dependent real parameters; and
C is an interaction strength arising from Van der Waals interactions between Rydberg atoms in a same Rydberg state |r>.

Figure 3:
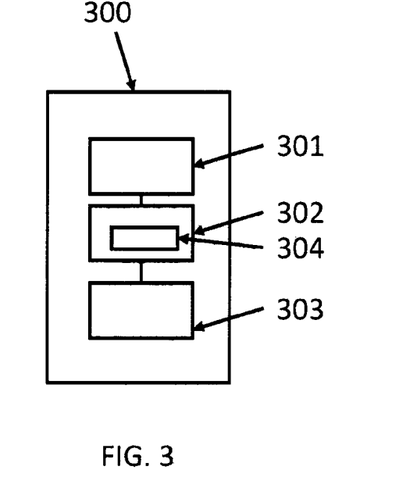
FIG. 3 illustrates an example device.

FIG. 3 illustrates an example computer system 300 comprising a processor 301, a memory 302 and a networking module 303, the processor 301 being configured to operate according to any of the methods hereby described. Processor 301 may comprise electronic circuits for computation managed by an operating system.

FIG. 3 also illustrates a non-transitory machine-readable or computer readable storage medium, such as, for example, memory or storage unit 302, whereby the non-transitory machine-readable storage medium is encoded with instructions 304 executable by a processor such as processor 301, the machine-readable storage medium comprising the instructions 304 to operate processor 301 to perform as per any of the example methods hereby described.

A computer readable storage according to this disclosure may be any electronic, magnetic, optical or other physical storage device that stores executable instructions. The computer readable storage may be, for example, Random Access Memory (RAM), an Electrically Erasable Programmable Read Only Memory (EEPROM), a storage drive, and optical disk, and the like. As described hereby, the computer readable storage may be encoded with executable instructions according to the methods hereby described.

Storage or memory may include any electronic, magnetic, optical or other physical storage device that stores executable instructions as described hereby.

A specific example of a method according to this disclosure relates to individually manipulating atoms or ions in a vacuum in optical tweezer traps. Operating a quantum computing operation or calculation using such a system may comprise applying one or more optical or electromagnetic pulses on such atoms or ions in view of manipulating their quantum state as qubits. The objective of such a manipulation is to implement a theoretical calculation with a relatively high degree of reliability on a real quantum computing system. The spatial position configuration of the atoms or ions in the system is susceptible to modify the interactions between such atoms or ions, such interactions impacting either negatively or positively on the attempt to resolve a problem. Such spatial position configuration will thereby have an impact on the physical encoding of a theoretical calculation. The methods hereby provided aim at improving the positioning of the atoms or ions of the quantum computing system, aiming at aligning effective real interactions between the atoms or ions with a theoretical or ideal implementation of the quantum calculation or operation. In the specific example described here, a Rydberg atoms platform is used as quantum computing system in view of attempting to resolve a UD-MIS NP difficult combinatorial optimization problem. Such quantum computing systems may for instance apply adiabatic quantum calculations to atoms, the position of which may be controlled, for example in optical tweezer traps. The methods hereby described may not only provide a higher likelihood to resolve a specific problem, but also may permit doing so using an overall shorter annealing time.

Maximum independent set problem example description: we consider a specific paradigmatic optimization problem called maximum independent set. Given a graph G with vertices V and edges E, we define an independent set as a subset of vertices where no pair is connected by an edge. The computational task is to find the largest such set, called the maximum independent set (MIS). Deciding whether the size of MIS is larger than a given integer for an arbitrary graph G is a well-known NP-complete problem, and even approximating the size of an optimal solution is NP-hard. When restricting the set of input graphs to unit-disk graphs, the problem is usually denoted as UD-MIS or Unit-Disk MIS. In spite of the restriction to a smaller set of graphs, UD-MIS is still NP-hard.

We may now turn to a physical system that allows us to tackle such problem. A large number of atoms can be individually and deterministically placed in a 2D plane using optical tweezers. Each atom, realizes a qubit with an internal ground state, and a highly excited, long-lived Rydberg state, which can be coherently manipulated by external laser fields. Each instance of the UD-MIS NP-complete problem may be transformed into an arrangement of atoms, such that the ground state of the related Hamiltonian is intuitively close to the solution of the problem. Indeed, we consider that the input unit-disk graph is given along with, or even given as, a set of positions in the 2D plane, each vertex corresponding to one position. The atoms may then be positioned according to a re-scaled version of this set of positions, wherein the rescaling factor corresponds to the Rydberg blockade radius. One should note that such positioning is an explicit connection between an MIS problem and Rydberg blockade physics. In some cases, more than 150 vertices may be considered, involving the positioning of a same number of atoms. Example methods according to this disclosure avoids using an intuitive heuristic or random strategy to choose an appropriate initial position configuration. The methods hereby described allow for automating positioning, based on a predefined, programmable similarity measure.

In this specific example, or in other examples, the similarity measure used is the distance in the Hamiltonian space, in other words the distance between Hamiltonian operators in Hilbert spaces. In this example, for Hamiltonians decomposed on the basis of Pauli operators: and:

$$H_1 = \sum_{i,j \text{ atoms}} \sum_{\alpha,\beta \in \{0,1,2,3\}} c_{i,j}^{\alpha,\beta} \cdot \sigma_i^\alpha \otimes \sigma_j^\beta + \sum_{i \text{ atoms}} \sum_{\alpha \in \{0,1,2,3\}} c_i^\alpha \cdot \sigma_i^\alpha$$

and:

$$H_2 = \sum_{i,j \text{ atoms}} \sum_{\alpha,\beta \in \{0,1,2,3\}} c_{i,j}^{\prime\alpha,\beta} \cdot \sigma_i^\alpha \otimes \sigma_j^\beta + \sum_{i \text{ atoms}} \sum_{\alpha \in \{0,1,2,3\}} c_i^{\prime\alpha} \cdot \sigma_i^\alpha$$

The distance between H1 and H2 is:

$$d(H_1, H_2) = \left( \sum_{i,j \text{ atomes}} \sum_{\alpha,\beta \in \{0,1,2,3\}} |c_{i,j}^{\alpha,\beta} \cdot c_{i,j}^{\prime\alpha,\beta}|^p + \sum_{i \text{ atomes}} \sum_{\alpha \in \{0,1,2,3\}} |c_i^\alpha - c_i^{\prime\alpha}|^p \right)^{1/p}$$

Parameter p may be any integer. The decomposition may be on a basis different from the Pauli basis. Any base of the Hamiltonian space may suffice.

In this specific example, or in other examples, a similarity measurement or distance measurement is used as a cost function in an iterative process towards better values. Such cost function may be noted as $c(H(\{x_i\}, \{t_i\}), H_{OPT})$. In this example, an objective is to reduce, increase, minimize or maximize such cost function, in other words for example finding $x_1^{OPT}, \ldots, x_n^{OPT} = \mathrm{argmin}_{\{x_i\}} d[H(\{x_i\}, \{t_i\}),$ where $H_{target}]$ is one target Hamiltonian encoding the problem, meaning that the fundamental state of such target Hamiltonian provide an exact solution to the specific problem, the resolution of which is being attempted. As an initial guess for the positions, the procedure could for instance take positions that are naturally and naively deduced from trying to encode the target problem into the quantum system at hand. Such attempts to encode the problem could be for instance based on intuition, potentially partly aided by programmatic routines, that would mechanically produce positions from a target problem instance to encode. If no such solutions are available, yet another possibility is to start with a uniformly random guess.

Figure 4:
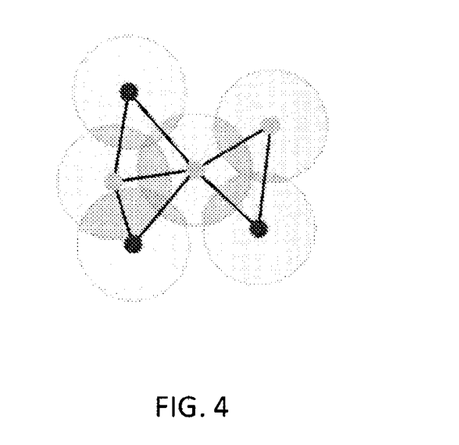
FIG. 4 illustrates an example graph corresponding to an example specific problem of an example method.

In this specific example, the method is used for a quantum computing system using Rydberg atoms in view of an adiabatic evolution calculation in order to attempt resolving the UD-MIS NP difficult combinatorial optimization problem. FIG. 4 illustrates an example unit disk graph in a plane, all disks having a same radius, whereby an MIS is represented in using a darker shade of grey at the center of the disks of the MIS. A graph is a unit disk graph if it comprises intersecting disks on a plane, each disk having a diameter of 1 unit. In other words, a unit disk graph may be defined by a number of positions $\vec{x}_1, \ldots, \vec{x}_n$ corresponding to the center of the disks. A vertex of the graph is associated to each such disk center position, whereby two vertices are connected if and only if $|\vec{x}_i - \vec{x}_j| \leq 2$. The positions given as a description of a unit-disk graph, given as input to the computation with the purpose of finding the MIS or as large of an independent set as possible, may be rescaled to serve as the initial point of the iterative process that will yield positions associated to a better similarity measure value.

In this specific example, the representative Hamiltonians are of the following form:

$$H_{Ryd} = \sum_{i,j} \frac{C}{|\vec{x}_i - \vec{x}_j|^6} n_i n_j - \sum_i \Delta_i(t) n_i + \sum_i \Omega_i(t) \sigma_i^x$$

where:

$\vec{x}_i$ is a real vector describing the position of the $i^{th}$ Rydberg atom in a two dimensional plane;

$$n_i = \frac{1 - \sigma_i^z}{2};$$

$$\sigma_i^x = \begin{pmatrix} 0 & 1 \\ 1 & 0 \end{pmatrix};$$

$\Delta_i(t)$ and $\Omega_i(t)$ are time-dependent real parameters, for example the laser detuning and the Rabi frequency at the position of the respective atom at a specific time t; and C is an interaction strength arising from Van der Waals interactions between Rydberg atoms in a same Rydberg state $|r\rangle$.

Figure 5:
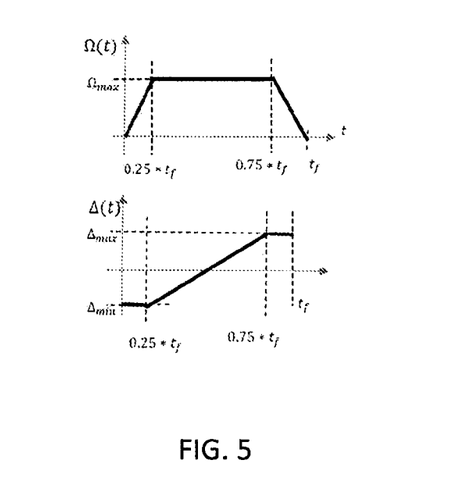
FIG. 5 illustrates an example parameter evolution for example Hamiltonians.

In order to attempt resolving a MIS problem on a UD graph using Rydberg it is proposed to proceed as follows:
1—Chose a final value for $\Delta(t)$ which may be implemented experimentally, and call this value $\Delta_f$
2—Calculate $$r_B = \left(\frac{C}{\Delta_f}\right)^6,$$

which is the Rydberg blocking radius;
3—For each vertices i of the graph associated to a position $x_i$ in the plane, position an atom at the position $r_B \cdot x_i$.
4—All atoms being in a $|0\rangle$ state, apply a temporal evolution of $\Omega$ and $\Delta$ as illustrated in FIG. 5 between t=0 and a final time $t_f$. $\Omega$ is first submitted do a constant increase to a maximum in 25% to the time period to the final time, maintained at the maximum during 50% of the time to the final time, and reduced constantly until the final time is reached, the reduction taking place during 25% of the time. More generally, $\Omega$ is progressively increased to a maximum level, maintained at the maximum level and then decreased back within the time up to the final time, whereby the period of time during which $\Omega$ is maintained at the maximum level is longer than any of the periods during which $\Omega$ is increased or decreased. During the same time period $\Delta$ is maintained to a minimum level, progressivly increased to a maximum level, and maintained at its maximum level, such evolution of $\Delta$ following as far as timing is concerned the same timing as the evolution of $\Omega$ whereby the maintaining of $\Omega$ at the maximum level coincides with the increase of $\Delta$ from the minimum level to the maximum level.
5—Proceed with a measurement on the atoms. If $t_f$ is sufficiently large, according to the adiabatic theorem the atoms are in the fundamental state of $H_{Ryd}$.

The MIS, or the largest subassembly of vertices which are not mutually connected of a graph G=(V, E) corresponds to the fundamental state of the following Hamiltonian:

$$H_{MIS} = \sum_{(u,v) \in E} U \cdot n_u n_v - \sum_{v \in V} \Delta \cdot n_v$$

For any set of parameters U, $\Delta$ such that $U > \Delta > 0$.

In this specific example, the distance between representative Hamiltonians $H_{Ryd}(t_f)$ and target Hamiltonian $H_{MIS}$ is used as a cost function within an iterative optimization process to identify a specific position configuration of atoms which reduce In this specific example, an extension base of the Hamiltonians constituted by operators $n_u$ for $u \in V$ is used, due to being particularly suited to this example. The distance between representative Hamiltonian $H_{Ryd}(t_f)$ and target Hamiltonian $H_{MIS}$, for example for p=1, is thereby:

$$d(H_{Ryd}(t_f), H_{MIS}) =$$
$$\sum_{(u,v) \in E} \left| \frac{C}{|\vec{x}_u - \vec{x}_v|^6} - U \right| + \sum_{(u,v) \notin E} \left| \frac{C}{|\vec{x}_u - \vec{x}_v|^6} \right| + \sum_{u \in V} |\Delta - \Delta_f|$$

Any value of $\Delta$ is valid, as long as $U > \Delta > 0$. We may therefore limit ourselves to ideal Hamiltonians $H_{MIS}$ for which $\Delta = \Delta_f$. The cost function thereby becomes:

$$d(H_{Ryd}(t_f), H_{MIS}) = \sum_{(u,v) \in E} \left| \frac{C}{|\vec{x}_u - \vec{x}_v|^6} - U \right| + \sum_{(u,v) \notin E} \left| \frac{C}{|\vec{x}_u - \vec{x}_v|^6} \right|$$

Let us define U as: $U = C/l_{eq}^6$, where $l_{eq}$ is an equilibrium length. This leads to:

$$d(H_{Ryd}(t_f), H_{MIS}) = \sum_{(u,v) \in E} \left| \frac{C}{|\vec{x}_u - \vec{x}_v|^6} - \frac{C}{l_{eq}^6} \right| + \sum_{(u,v) \notin E} \left| \frac{C}{|\vec{x}_u - \vec{x}_v|^6} \right|$$

An empirical choice may for example be $l_{eq} = 0.8 \cdot r_B$ where $r_B$ is the Rydberg blocking radius.

Figure 6:
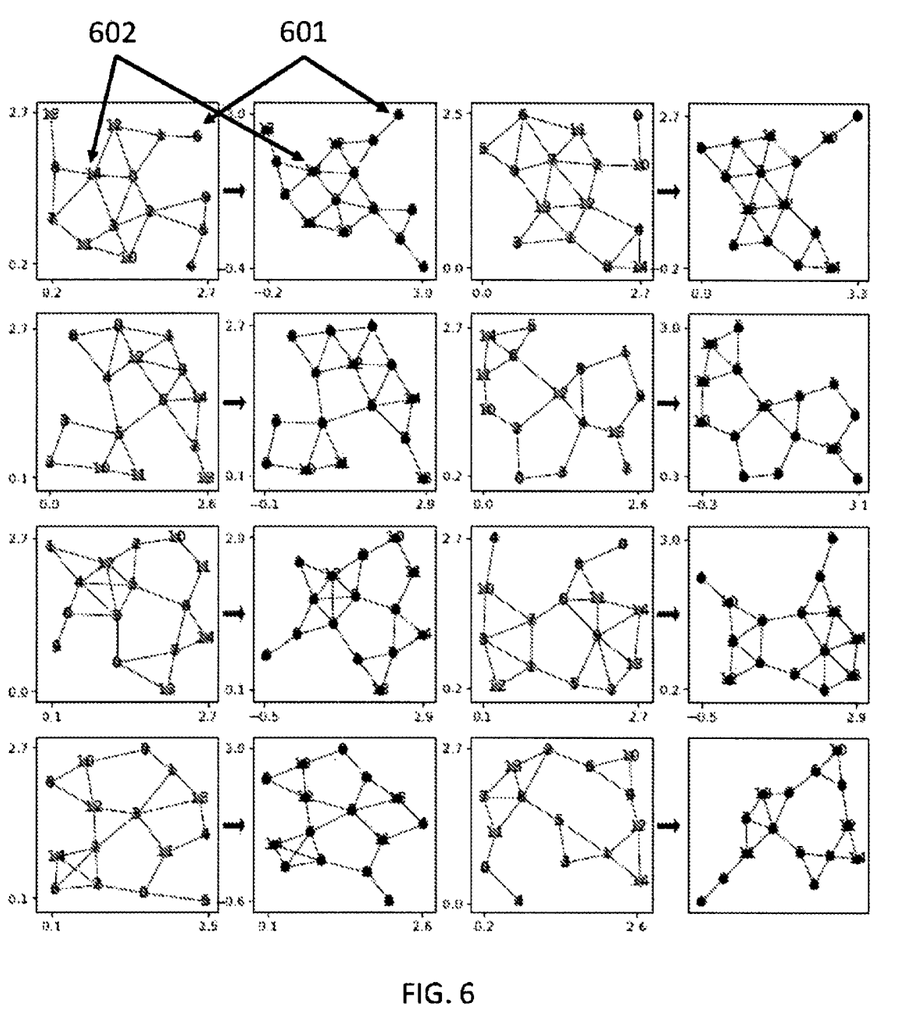
FIG. 6 illustrates example position configurations.

FIG. 6 illustrates example eight different UD graphs before and after applying an example method according to this disclosure, the corresponding before and after graphs being separated by a black arrow, the graph after processing by an example method according to this disclosure being directly to the right hand side of the corresponding graph prior to processing. The dots represented on the graphs represent graph vertices which are connected by edges represented by segments between dots. Using the example method according to this disclosure, dots which are less connected to others are pushed away from other dots (see for example the dot reference as 601 in FIG. 6), while dots more connected to others are placed at a homogeneous distance from each other (see for example the dot referenced as 602 on FIG. 6).

A cost function has been used in the specific example in order to determine the specific position configuration. Calculation of the first two terms of the cost function $$\left( \sum_{(u,v) \in E} \left| \frac{C}{|\vec{x_u} - \vec{x_v}|^6} - \frac{C}{l_{eq}^6} \right| + \sum_{(u,v) \notin E} \left| \frac{C}{|\vec{x_u} - \vec{x_v}|^6} \right| \right)$$

are limited to pairs of atoms sufficiently close so their contribution is not too reduced. In the specific example, such "sufficiently close" distance has been selected as $3 \cdot r_B$. Such a limitation to atoms being relatively close, or more generally at a proximity of less than a predetermined proximity threshold, permits reducing significantly the calculation time.

The invention claimed is:

1. A method for positioning atoms using optical tweezer traps, comprising:
   determining a specific position configuration whereby a specific similarity measure between a target Hamiltonian and a specific Hamiltonian of a set of representative Hamiltonians of the specific position configuration is improved compared to another similarity measure between the target Hamiltonian and at least one other representative Hamiltonian of the set of representative Hamiltonians of a position configuration differing from the specific position configuration, the target Hamiltonian encoding a specific problem to resolve using an optical tweezer traps quantum computing system, the set of representative Hamiltonians comprising representative Hamiltonians each being a function of a position configuration of atoms in the quantum computing system, whereby the determining of the specific position configuration comprises iteratively evaluating similarity measures between the target Hamiltonian and a plurality of representative Hamiltonians, whereby each iteration corresponds to evaluating a similarity measure between the target Hamiltonian and a representative Hamiltonian of the plurality which corresponds to a given position configuration of atoms, whereby each iteration corresponds to a different position configuration of atoms; and
   in response to the determination of the specific position configuration, positioning atoms using optical tweezer traps in the specific position configuration in order to attempt to resolve the specific problem using the quantum computing system.

2. The method according to claim 1, whereby each representative Hamiltonian is a function of a time variable, the time variable corresponding to an adiabatic evolution of the quantum computing system for attempting to resolve the specific problem.

3. The method according to claim 1, whereby the iterative evaluation is a converging iterative evaluation.

4. The method according to claim 1, whereby the iterative evaluation is concluded when a condition is met.

5. The method according to claim 4, whereby the condition comprises the specific similarity measures being compared to a similarity measures threshold.

6. The method according to claim 4, whereby the condition comprises a number of iterations reaching an iteration limit.

7. The method according to claim 1, whereby the method further comprises attempting to resolve the specific problem using the quantum computing system in response to the positioning of the atoms, the attempt to resolve occurring through an adiabatic evolution.

8. The method according to claim 1, whereby the specific problem is a Maximum Independent Set, MIS, problem.

9. The method according to claim 1, whereby the atoms optical tweezer traps quantum computing system is a two-dimensional Rydberg atoms optical tweezer traps quantum computing system.

10. The method according to claim 1, whereby the similarity measure is a function of a Rydberg blocking radius of the atoms.

11. The method according to claim 1, whereby the positioning takes place in an optical tweezer traps device using lasers of the optical tweezer traps.

12. The method according to claim 11, whereby the atoms optical tweezer traps quantum computing system is a two-dimensional Rydberg atoms optical tweezer traps quantum computing system.

13. The method according to claim 12, whereby the similarity measures correspond to a distance.

14. The method according to claim 13, whereby the similarity measure is a function of a Rydberg blocking radius of the atoms.

15. A non-transitory computer-readable storage medium comprising instructions executable by a processor for positioning atoms using optical tweezer traps, the computer-readable storage medium comprising:
   instructions to determine a specific position configuration whereby a specific similarity measure between a target Hamiltonian and a specific Hamiltonian of a set of representative Hamiltonians of the specific position configuration is improved compared to another similarity measure between the target Hamiltonian and at least one other representative Hamiltonian of the set of representative Hamiltonians of a position configuration differing from the specific position configuration, the target Hamiltonian encoding a specific problem to resolve using an optical tweezer traps quantum computing system, the set of representative Hamiltonians comprising representative Hamiltonians each being a function of a position configuration of atoms in the quantum computing system, whereby the determination of the specific position configuration comprises an iterative evaluation of similarity measures between the target Hamiltonian and a plurality of representative Hamiltonians, whereby each iteration corresponds to evaluating a similarity measure between the target Hamiltonian and a representative Hamiltonian of the plurality which corresponds to a given position configuration of atoms, whereby each iteration corresponds to a different position configuration of atoms; and instructions to, in response to the determination of the specific position configuration, position atoms using optical tweezer traps in the specific position configuration in order to attempt to resolve the specific problem using the quantum computing system.

16. A system comprising:

a processor, and a non-transitory computer-readable storage device in communication with the processor, wherein the system is configured to position atoms using optical tweezer traps, and wherein the non-transitory computer-readable storage device contains instructions to:

determine a specific position configuration whereby a specific similarity measure between a target Hamiltonian and a specific Hamiltonian of a set of representative Hamiltonians of the specific position configuration is improved compared to another similarity measure between the target Hamiltonian and at least one other representative Hamiltonian of the set of representative Hamiltonians of a position configuration differing from the specific position configuration, the target Hamiltonian encoding a specific problem to resolve using an optical tweezer traps quantum computing system, the set of representative Hamiltonians comprising representative Hamiltonians each being a function of a position configuration of atoms in the quantum computing system, whereby the determination of the specific position configuration comprises an iterative evaluation of similarity measures between the target Hamiltonian and a plurality of representative Hamiltonians, whereby each iteration corresponds to evaluating a similarity measure between the target Hamiltonian and a representative Hamiltonian of the plurality which corresponds to a given position configuration of atoms, whereby each iteration corresponds to a different position configuration of atoms; and in response to the determination of the specific position configuration, position atoms using optical tweezer traps in the specific position configuration in order to attempt to resolve the specific problem using the quantum computing system.

* * * * *